United States Patent
Chan et al.

(10) Patent No.: US 9,661,670 B2
(45) Date of Patent: May 23, 2017

(54) IDLE MODE LOAD BALANCING

(71) Applicant: Verizon Patent and Licensing Inc., Arlington, VA (US)

(72) Inventors: Yee Sin Chan, San Jose, CA (US); Zheng Zhao, Plainsboro, NJ (US); Jignesh S. Panchal, Somerset, NJ (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 14/584,051

(22) Filed: Dec. 29, 2014

(65) Prior Publication Data

US 2016/0192370 A1 Jun. 30, 2016

(51) Int. Cl.
*H04W 76/02* (2009.01)
*H04W 72/02* (2009.01)
*H04W 72/06* (2009.01)

(52) U.S. Cl.
CPC ......... *H04W 76/023* (2013.01); *H04W 72/02* (2013.01); *H04W 72/06* (2013.01)

(58) Field of Classification Search
None
See application file for complete search history.

(56) References Cited

U.S. PATENT DOCUMENTS

| 7,933,238 | B2* | 4/2011 | Sartori | H04L 1/0003 370/328 |
| 8,423,019 | B2* | 4/2013 | Rao | H04W 48/16 370/331 |
| 8,923,228 | B2* | 12/2014 | Dalsgaard | H04L 5/0007 370/329 |
| 8,942,710 | B2* | 1/2015 | Brisebois | H04W 16/08 455/445 |
| 9,331,833 | B2* | 5/2016 | Tseng | H04L 5/0062 |
| 9,397,804 | B2* | 7/2016 | Sridhar | H04L 5/0044 |
| 2008/0219219 | A1* | 9/2008 | Sartori | H04L 1/0003 370/335 |
| 2011/0176424 | A1* | 7/2011 | Yang | H04L 41/0803 370/236.2 |

(Continued)

FOREIGN PATENT DOCUMENTS

FR WO 2013188392 A2 * 12/2013 ........... H04L 5/0044

OTHER PUBLICATIONS

Alcatel-Lucent, Verizon, "Idle UE Distribution in Macro Only System and HetNets," 3GPP TSG-RAN WG2 Meeting #86 R2-142495, Seoul, South Korea, Agenda Item: 7.11.1, Document for: Discussion & Decision, May 19-23, 2014, 6 pages.

*Primary Examiner* — Ayaz Sheikh
*Assistant Examiner* — Faiyazkhan Ghafoerkhan

(57) ABSTRACT

A base station may establish a wireless connection with a mobile device. The base station may determine an index value for each of a plurality of carriers that may be used for the wireless connection. The index value for a respective carrier may be determined based on a quantity of idle mode devices using the respective carrier in an idle mode. The base station may generate a carrier order that indicates a priority for each of the plurality of frequencies. The carrier order may be generated based on sorting the plurality of carriers based on the index values for the plurality of carriers. The base station may send order information indicating the carrier order to the mobile device via the wireless connection.

20 Claims, 6 Drawing Sheets

(56) References Cited

U.S. PATENT DOCUMENTS

| | | | |
|---|---|---|---|
| 2011/0216723 A1* | 9/2011 | Sartori | H04L 1/0003 370/329 |
| 2012/0094679 A1* | 4/2012 | Rao | H04W 48/16 455/450 |
| 2012/0115468 A1* | 5/2012 | Lindoff | H04W 36/06 455/434 |
| 2012/0207121 A1* | 8/2012 | Dalsgaard | H04L 5/0007 370/329 |
| 2012/0300720 A1* | 11/2012 | Gou | H04L 5/001 370/329 |
| 2013/0148603 A1* | 6/2013 | Lee | H04L 5/001 370/329 |
| 2013/0208699 A1* | 8/2013 | Hakkinen | H04W 76/046 370/331 |
| 2013/0336110 A1* | 12/2013 | Sridhar | H04L 5/0044 370/230 |
| 2014/0024382 A1* | 1/2014 | Zou | H04W 16/08 455/445 |
| 2014/0066077 A1* | 3/2014 | Brisebois | H04W 16/08 455/445 |
| 2014/0074995 A1* | 3/2014 | Beattie, Jr. | H04L 41/0816 709/220 |
| 2015/0017987 A1* | 1/2015 | Won | H04W 48/12 455/436 |
| 2015/0099529 A1* | 4/2015 | Brisebois | H04W 16/08 455/453 |
| 2015/0131441 A1* | 5/2015 | Huang | H04W 28/08 370/235 |
| 2016/0044539 A1* | 2/2016 | Yiu | H04W 36/26 370/235 |
| 2016/0192370 A1* | 6/2016 | Chan | H04W 76/023 370/329 |

\* cited by examiner

IDLE MODE LOAD BALANCING

BACKGROUND

A multi-band device may be a communication device that supports multiple radio frequency bands. The multi-band device may switch between different radio frequency bands during communication with an operator network.

DETAILED DESCRIPTION OF PREFERRED EMBODIMENTS

The following detailed description of example implementations refers to the accompanying drawings. The same reference numbers in different drawings may identify the same or similar elements.

Operator networks (e.g., mobile wireless networks) have experienced growth in both the number of devices connecting to operator networks and the amount of traffic over the operator networks. Operator networks may support multiple carriers (e.g., radio frequency bands) and an operator network may attempt to load balance the traffic across the multiple carriers to improve the overall network performance and user experience compared to minimizing the traffic on any one carrier.

When load balancing is done after a Radio Resource Control (RRC) communication is already established between a mobile device and a base station included in the operator network (e.g., when mobile devices are in a RRC connected mode), load balancing may be achieved by an inter-frequency handover from one carrier to another carrier. However, such a handover may decrease the overall user experience and/or network performance due to the handover procedure. For example, communication sessions may be dropped or interrupted during a handover. Additionally, handing over a communication session with a mobile device after the RRC connection is already established on a particular carrier may cause congestion on a random access channel of the particular carrier because multiple mobile devices may use the same random access channel to initialize the RRC connection.

Implementations described herein may perform load balancing on an operator network by balancing which carriers mobile devices camp on while the mobile devices are in a RRC idle mode. Idle mode load balancing, as opposed to connected mode load balancing, may avoid or reduce congestion on random access channels of carriers by causing mobile devices to use different carriers to initiate a RRC connection. Additionally, or alternatively, idle mode load balancing, as opposed to connected mode load balancing, may minimize or reduce the inter-frequency handover of a communication session due to a RRC connection being originally initialized on an appropriate carrier.

Figure 1:
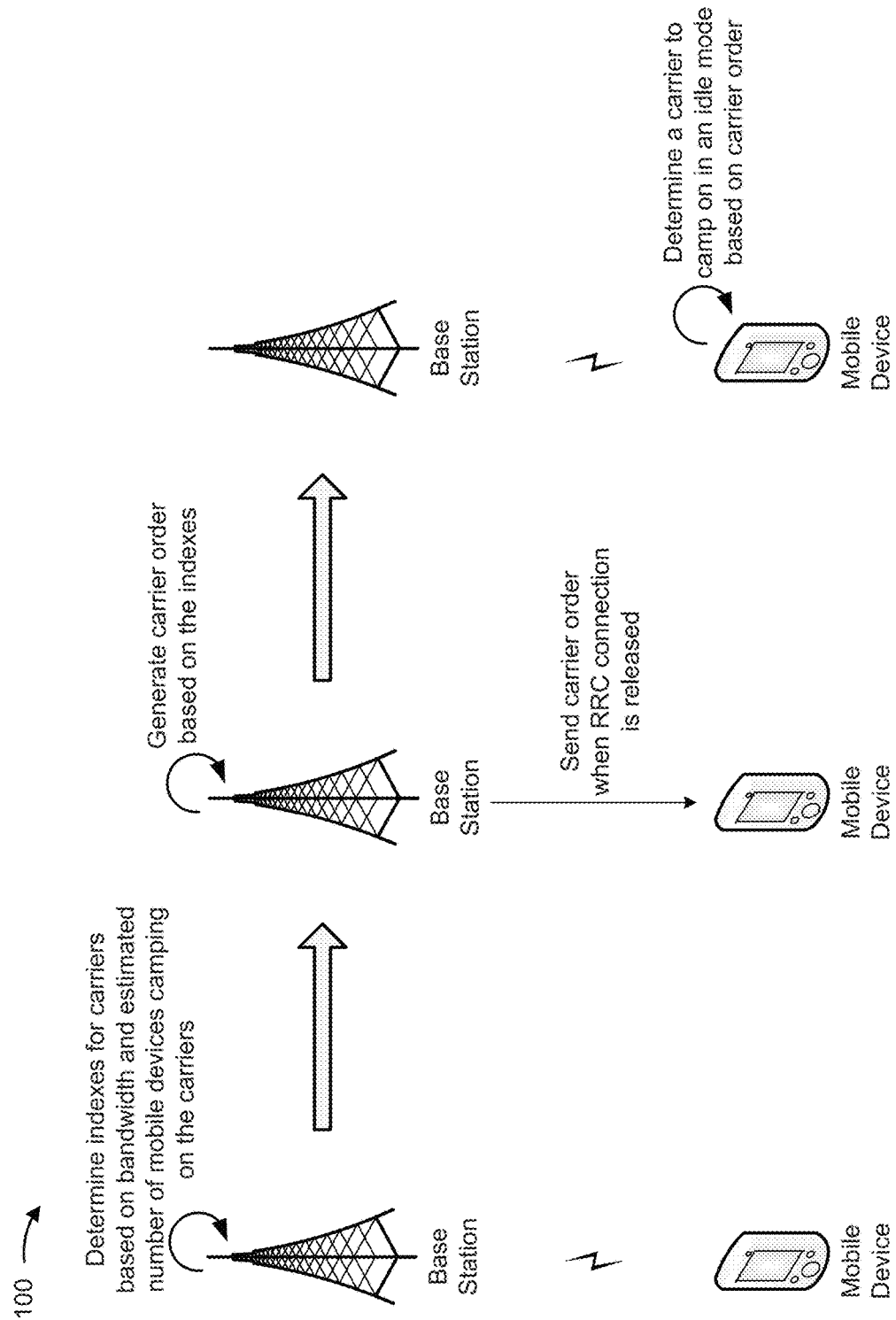
FIG. 1 is a diagram of an overview of an example implementation described herein.

FIG. 1 is a diagram of an overview of an example implementation 100 described herein. As shown in FIG. 1, a base station and a mobile device may communicate with one another via a RRC connection. Assume the base station and the mobile device are configured to operate on multiple carriers. While the RRC connection is established between the base station and the mobile device, the mobile device may be in a RRC connected mode.

The base station may estimate the number of mobile devices in a RRC idle mode that are camping (e.g., tuned to and monitoring a control channel) on each of multiple carriers. In a RRC idle mode, a mobile device may not have a RRC connection established with the base station. Rather, the mobile device may be camping on a particular carrier that the mobile device will use when the mobile device initiates a RRC connection at a future time. Accordingly, the base station may not be able to detect which mobile devices are currently camping on a carrier because there is not an active RRC connection between the base station and the mobile devices. Thus, the base station may estimate the number of mobile devices camping on a carrier based on how many mobile devices have initiated a RRC connection on the carrier over a particular time period because the number of mobile devices camping on the carrier may be proportional to the number of mobile devices that have initiated a RRC connection on the carrier.

The base station may generate an index value for a carrier based on the estimated number of mobile devices camping on the carrier and a bandwidth of the carrier. The base station may sort the index values in order of priority and generate a carrier order (e.g., a carrier frequency order). The carrier order may be a list of carriers (e.g., carrier frequencies) in order of priority based on the index values.

When the base station determines to release the RRC connection with the mobile device (e.g., when the RRC connection is completed), the base station may send information indicating the carrier order to the mobile device. The mobile device may switch from the RRC connected mode to the RRC idle mode based on the RRC connection being released. The mobile device may determine a carrier to camp on in the RRC idle mode based on the carrier order. For example, the mobile device may select a carrier with the highest priority indicated by the carrier order on which to camp. The selected carrier may be different than the carrier previously used for the RRC connection.

Accordingly, when the mobile device attempts to initiate a RRC connection at a future time, the mobile device may initiate the RRC connection on a different carrier (e.g., a carrier with a smallest estimated number of mobile devices camping on the carrier), thereby balancing the load on the carriers supported by the base station.

Figure 2:
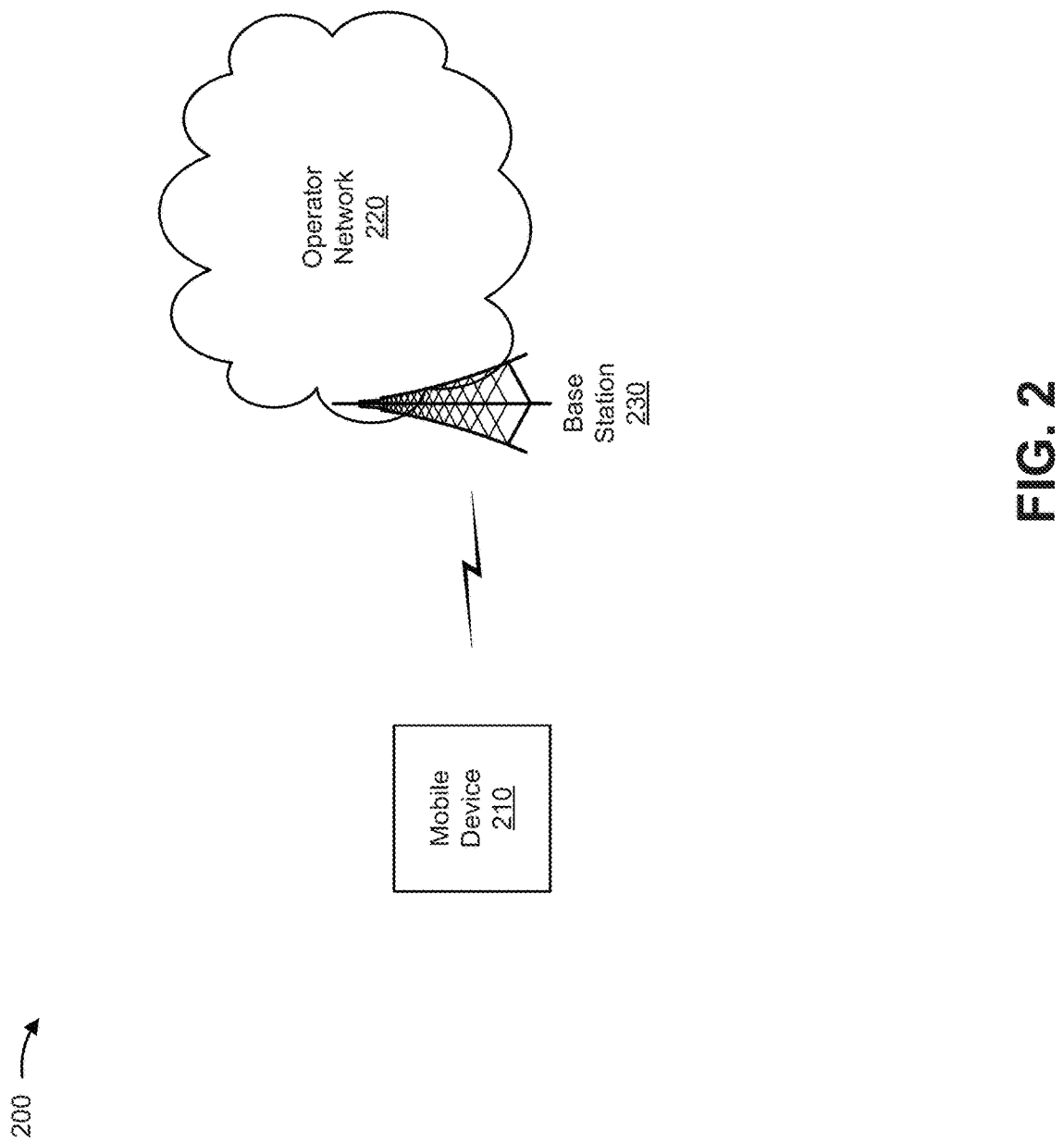
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, an operator network 220, and/or a base station 230. Devices of environment 200 may interconnect via wired connections, wireless connections, or a combination of wired and wireless connections.

Mobile device 210 may include one or more devices capable of receiving, generating, storing, processing, and/or providing information. For example, mobile device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, mobile device 210 may receive information from and/or transmit information to another device in environment 200.

Operator network 220 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 230) via which mobile devices 210 communicate with the EPC. The EPC may include a serving gateway (SGW), a mobility management entity device (MME), and/or a packet data network gateway (PGW) that enables mobile devices 210 to communicate with a network and/or an Internet protocol (IP) multimedia subsystem (IMS) core. The IMS core may include a home subscriber server (HSS)/authentication, authorization, accounting (AAA) server, a policy and charging rules function (PCRF) server, and/or a call session control function (CSCF) server and may manage certain information and services, such as authentication, session initiation, account information, and/or a user profile, associated with mobile devices 210. The LTE network may include multiple base stations 230, and the EPC may include multiple SGWs, MMEs, and/or PGWs. Additionally, or alternatively, operator network 220 may include a CDMA network, a public land mobile network (PLMN), a second generation (2G) network, a third generation (3G) network, a fourth generation (4G) network, a fifth generation (5G) network, and/or a similar type of network.

Base station 230 may include one or more devices capable of communicating with mobile device 210 using a cellular radio access technology. For example, base station 230 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 230 may transfer traffic between mobile device 210 and a network (e.g., the Internet). In some implementations, base station 230 may communicate with mobile device 210 (and/or one or more other devices) using radio waves.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
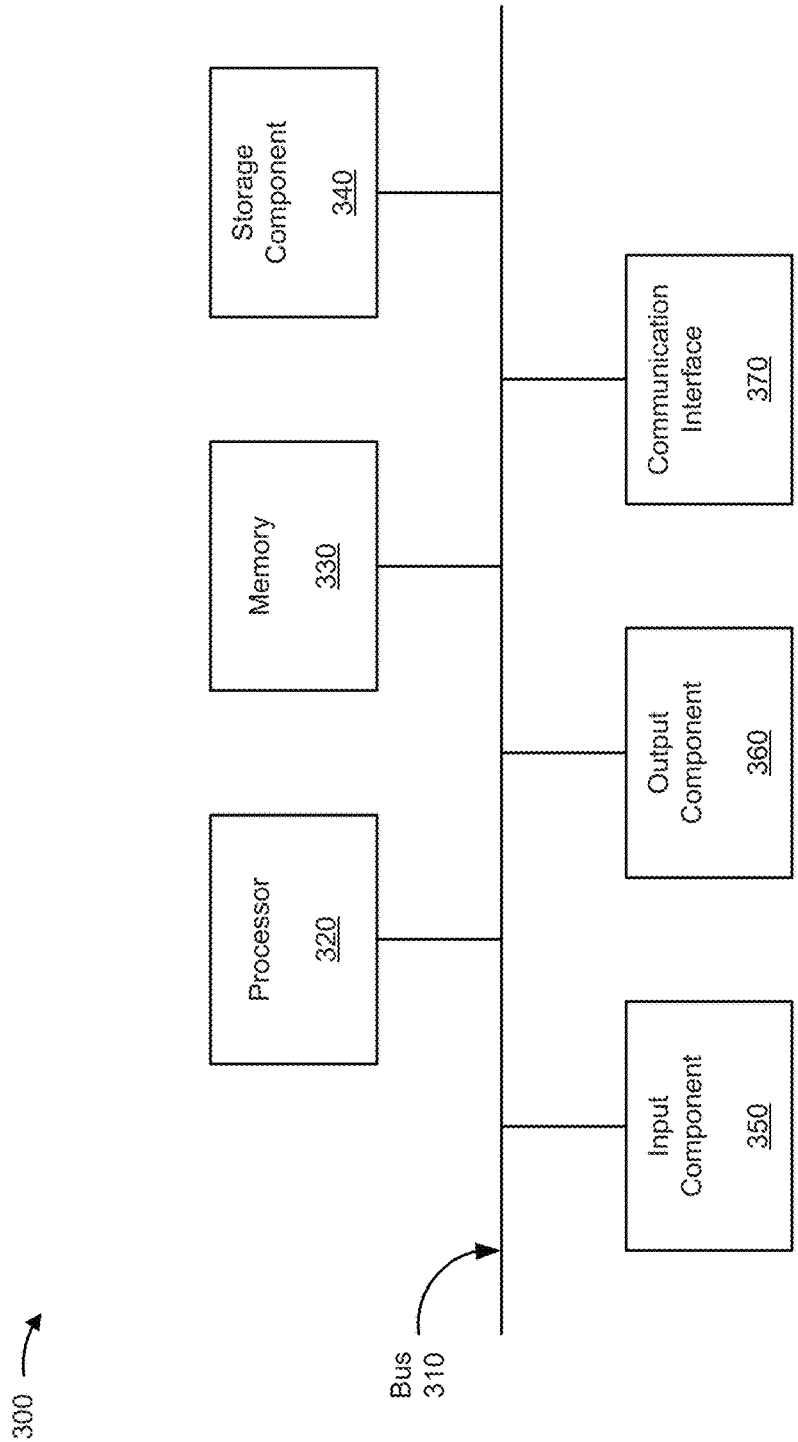
FIG. 3 is a diagram of example components of one or more devices of FIG. 2.

FIG. 3 is a diagram of example components of a device 300. Device 300 may correspond to mobile device 210 and/or base station 230. In some implementations, mobile device 210 and/or base station 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
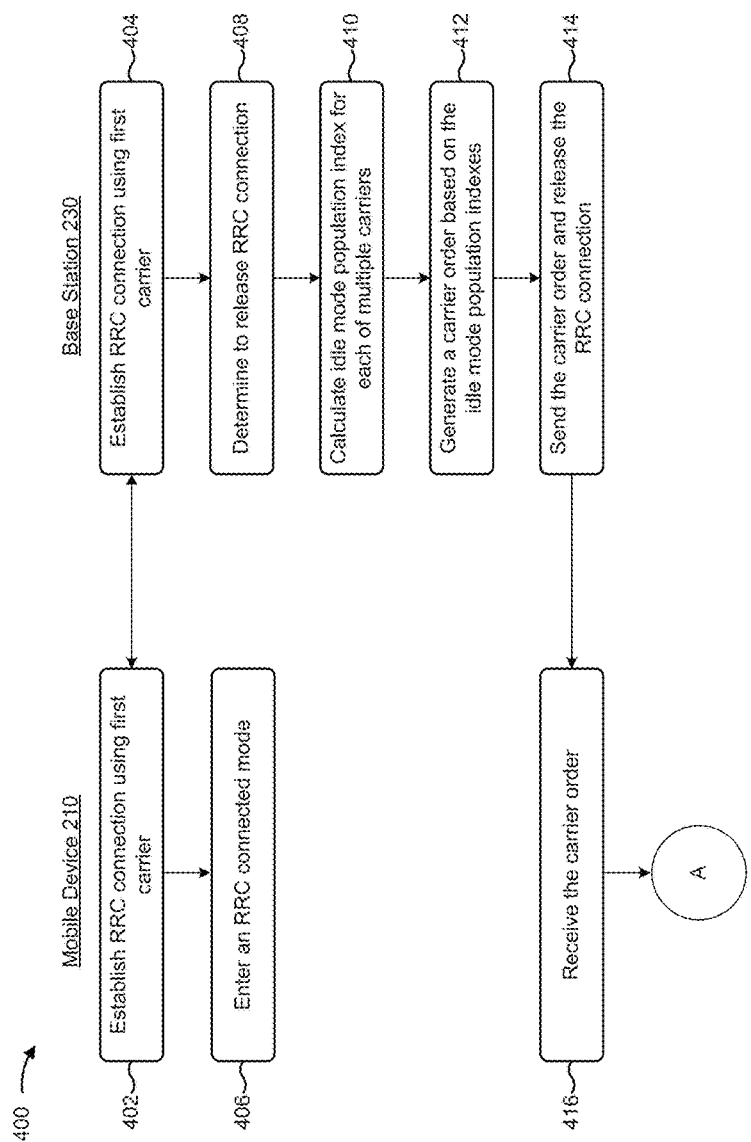
FIGS. 4A and 4B are flow charts of an example process for load balancing mobile devices in an idle mode.
Figure 4B:
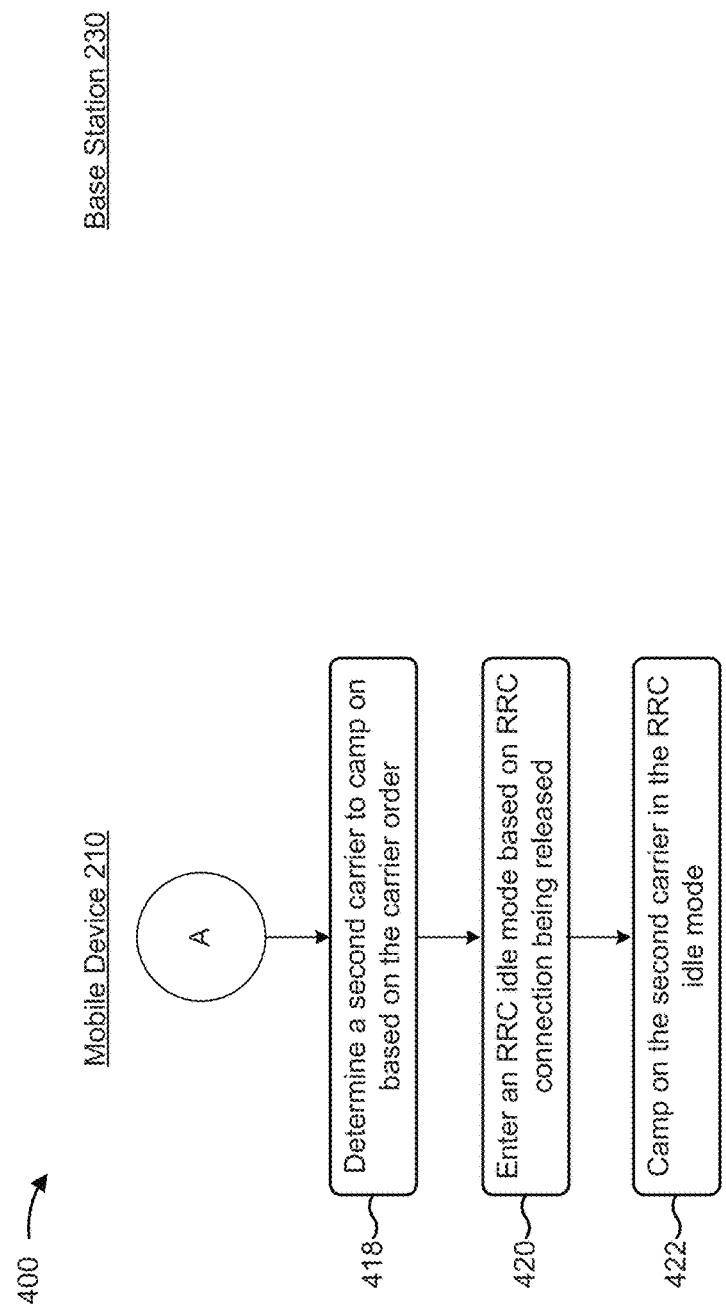

FIGS. 4A and 4B are flow charts of an example process 400 for load balancing mobile devices 210 in an idle mode. In some implementations, one or more process blocks of FIGS. 4A and 4B may be performed by mobile device 210 and/or base station 230. Additionally, or alternatively, one or more process blocks of FIGS. 4A and 4B may be performed by another device or a group of devices separate from or including mobile device 210 and/or base station 230, such as other devices included in operator network 220.

As shown in FIG. 4A, process 400 may include establishing a RRC connection using a first carrier (block 402). For example, mobile device 210 may establish the RRC connection with base station 230.

Mobile device 210 may be in a RRC idle mode in which mobile device 210 camps on a first carrier, but does not have a RRC connection with base station 230. Camping on a carrier may include being tuned to a control channel included in the carrier, monitoring the control channel, receiving paging messages on the control channel, responding to paging messages on the control channel, or the like. Mobile device 210 may send a RRC connection request to base station 230 on a random access channel of the first carrier.

Base station 230 may receive the RRC connection request sent from mobile device 210. Base station 230 may send a RRC connection setup message to mobile device 210 based on receiving the RRC connection request. The RRC connection setup message may include radio resource information for establishing the RRC connection.

Mobile device 210 may receive the RRC connection setup message and set up the RRC connection based on the RRC connection setup message. Mobile device 210 may send a RRC setup complete message to base station 230 based on setting up the RRC connection. Base station 230 may receive the RRC setup complete message, thereby confirming that the RRC connection has been established between mobile device 210 and base station 230 on the first carrier.

As further shown in FIG. 4A, process 400 may include establishing a RRC connection using the first carrier (block 404). For example, base station 230 may establish the RRC connection with mobile device 210 as discussed with respect to block 402.

As further shown in FIG. 4A, process 400 may include entering a RRC connected mode (block 406). For example, mobile device 210 may enter the RRC connected mode.

Mobile device 210 may switch from the RRC idle mode to the RRC connected mode based on establishing the RRC connection. In the RRC connected mode, mobile device 210 may communicate data with base station 230 and/or communicate data with other devices via base station 230 and/or operator network 220.

As further shown in FIG. 4A, process 400 may include determining to release the RRC connection (block 408). For example, base station 230 may determine to release the RRC connection.

In some implementations, mobile device 210 may send a RRC release request to base station 230. For example, mobile device 210 may send the RRC release request based on a communication session being completed and/or a signal strength of the first carrier failing to satisfy a threshold level. Base station 230 may receive the RRC release request and determine to release the RRC connection based on the RRC release request.

Additionally, or alternatively, base station 230 may detect a timeout period has expired and determine to release the RRC connection based on the timeout period expiring. For example, a timeout period may expire upon the RRC connection being inactive (e.g., no data being communicated) for a threshold amount of time.

Additionally, or alternatively, base station 230 may determine to release the RRC connection based on a load of the first carrier. For example, if a load of the first carrier satisfies a threshold level, base station 230 may determine that the RRC connection with mobile device 210 and/or other mobile devices 210 should be released to reduce the load on the first carrier.

As further shown in FIG. 4A, process 400 may include calculating an idle mode population index for each of multiple carriers (block 410). For example, base station 230 may calculate the idle mode population indexes.

An idle mode population index may be a value that represents a normalized population of mobile devices 210 camping on a particular carrier in an idle mode. Because a mobile device 210 in an idle mode is only camping on a particular carrier, base station 230 may have no way of identifying which mobile devices 210 are camping on that particular carrier. Accordingly, base station 230 may estimate the quantity of mobile devices 210 camping on a particular carrier based on assuming that the quantity of mobile devices 210 that initialize RRC connections on the particular carrier is proportional to the quantity of idle mode mobile devices 230 that are camping on the particular carrier. For example, if a mobile device 210 initializes a RRC connection on a particular carrier, then the mobile device 210 may have been camping on that particular carrier before the RRC connection.

Base station 230 may estimate a quantity of idle mode mobile devices 230 N on a particular carrier i by tracking a quantity of RRC connection initiations M for the carrier i made within a particular time period. The quantity of idle mode mobile devices 230 N may be determined based on Formula 1:

$$N_i = kM_i;  \quad \text{Formula 1:}$$

where k is a constant.

Different carriers may have different bandwidths. Thus, base station 230 may generate the idle mode population index to normalize the quantity of idle mode mobile devices 230 N on a carrier i based on the bandwidth B of the carrier i. Base station 230 may generate the idle mode population index ψ based on Formula 2:

$$\psi_i = \frac{N_i}{B_i} = \frac{kM_i}{B_i} \quad \text{Formula 2:}$$

Assuming there are X number of carriers, the n-tuples for the idle mode population index ψ may be expressed by Formula 3:

$$\{\psi_i\}_{i=1:X} = \left\{\frac{N_i}{B_i}\right\}_{i=1:X} = \left\{\frac{kM_i}{B_i}\right\}_{i=1:X} \quad \text{Formula 3:}$$

Furthermore, because the constant k will be approximately the same for all carriers, the n-tuples for the idle mode population index w may be estimated by Formula 4:

$$\{\psi_i\}_{i=1:X} = \left\{ \frac{M_i}{B_i} \right\}_{i=1:X} \quad \text{Formula 4:}$$

In other words, an idle mode population index for a particular carrier may be calculated based on a quantity of RRC connection initiations made on the carrier during a particular time period and based on the bandwidth of the carrier. Base station 230 may calculate the idle mode population index for each of multiple carriers.

In some implementations, an idle mode population index for a carrier may be weighted. For example, a party that controls base station 230 (e.g., an operator of operator network 220) may desire to have more traffic on a particular carrier than another carrier. For instance, the particular carrier may have better range than the other carrier or otherwise be better suited for communicating data with mobile device 210. Accordingly, the idle mode population indexes may be weighted based on load factors W set by the operator of operator network 220. The weighted idle mode population indexes φ may be expressed by Formula 5:

$$\{\varphi_i\}_{i=1:X} = \left\{ \frac{1}{W_i} \psi_i \right\}_{i=1:X}; \quad \text{Formula 5:}$$

where W may have values from 1 to M (the quantity of RRC connection initiations M being the maximum load factor).

As further shown in FIG. 4A, process 400 may include generating a carrier order based on the idle mode population indexes (block 412). For example, base station 230 may generate the carrier order.

Base station 230 may generate the carrier order by sorting the carriers based on the idle mode population indexes ψ and/or the weighted idle mode population indexes φ. For example, the carrier order may be a listed order of the carriers in ascending or descending order of priority as determined based on the on the idle mode population indexes ψ and/or the weighted idle mode population indexes φ. The carrier order Ω may be calculated, for example, using Formula 6A and/or Formula 6B:

$$\Omega = \{i'\}_{i'=1:\aleph}; \text{ where } \psi_{i'} \leq \psi_{i'+1}, \forall i' \in \{1:\aleph\}; \quad \text{Formula 6A:}$$

$$\Omega = \{i'\}_{i'=1:\aleph}; \text{ where } \varphi_{i'} \leq \varphi_{i'+1}, \forall i' \in \{1:\aleph\}. \quad \text{Formula 6B:}$$

As further shown in FIG. 4A, process 400 may include sending the carrier order and releasing the RRC connection (block 414). For example, base station 230 may send the carrier order to mobile device 210 and release the RRC connection with mobile device 210.

Base station 230 may send information identifying the carrier order to mobile device 210 through dedicated priorities in the RRC signaling when releasing the RRC connection. For example, base station 230 may use a dedicated RRC signaling channel to send the information identifying the carrier order and/or include the information identifying the carrier order in a RRC signal (e.g., a RRC release command). Base station 230 may release the RRC connection by sending a RRC release command to mobile device 210 based on determining to release the RRC connection.

As further shown in FIG. 4A, process 400 may include receiving the carrier order (block 416). For example, mobile device 210 may receive the information identifying the carrier order sent by base station 230 and receive the RRC release command sent by base station 230. Mobile device 210 may store the information identifying the carrier order in a memory included in or accessible by mobile device 210.

As shown in FIG. 4B, process 400 may include determining a second carrier to camp on based on the carrier order (block 418). For example, mobile device 210 may determine the second carrier on which to camp.

In some implementations, mobile device 210 may select a carrier on which to camp based on the carrier order indicating that the second carrier has the highest priority. For example, mobile device 210 may select the top-ranked carrier listed in the carrier order. In example process 400, assume the carrier order indicates that a second carrier has the highest priority. The second carrier may be the same carrier as or a different carrier than the first carrier.

In some implementations, mobile device 210 may determine a carrier on which to camp based on the carrier order and signal strengths of the carriers. For example, mobile device 210 may detect a signal strength for each carrier indicated by the carrier order. A signal strength may be indicated by a Received Signal Strength Indicator (RSSI), a Reference Signal Received Power (RSRP), and/or another indication of signal strength of a carrier. Mobile device 210 may store information indicating a threshold signal strength. Mobile device 210 may select a carrier on which to camp that has the highest priority indicated by the carrier order and that satisfies the threshold signal strength. In this way, mobile device 210 may avoid selecting a carrier on which to camp that has a relatively low signal strength, and that may result in poor communication, even though the carrier order indicates that the carrier has a high priority. Additionally, or alternatively, mobile device may determine a carrier on which to camp based on the carrier order and a Reference Signal Received Quality (RSRQ) and/or a signal-to-interference-plus-noise ratio (SINR).

In some implementations, mobile device 210 may determine a carrier based on which carriers mobile device 210 supports. For example, the carrier order may indicate carriers that base station 230 supports, but that mobile device 210 does not support (e.g., is not configured to use). Accordingly, mobile device 210 may select a carrier on which to camp that has the highest priority indicated by the carrier order and that mobile device 210 supports.

In some implementations, mobile device 210 may determine a carrier based on a combination of the carrier order, the signal strength for each carrier, and/or which carriers mobile device 210 supports.

As further shown in FIG. 4B, process 400 may include entering the RRC idle mode based on the RRC connection being released (block 420). For example, mobile device 210 may enter the RRC idle mode based on receiving the RRC release command from base station 230. In other words, mobile device 210 may switch from the RRC connected mode to the RRC idle mode.

As further shown in FIG. 4B, process 400 may include camping on the second carrier in the RRC idle mode (block 422). For example, mobile device 210 may camp on the second carrier in the RRC idle mode.

Accordingly, when mobile device 210 attempts to initiate a RRC connection at a future time, mobile device 210 will send the RRC connection request over a random access channel of the second carrier on which mobile device 210 is camping, instead of a random access channel of the first carrier which mobile device 210 previously used to establish the RRC connection. Thus, congestion of random access channels may be avoided and the load may be balanced between different carriers when the RRC connection between mobile device 210 and base station 230 is released.

Moreover, because mobile device 210 will establish the future RRC connection on the second carrier, a handover from the first carrier to the second carrier may be avoided after a future RRC connection is established. Therefore, a network efficiency and a user experience may be improved by balancing the load of idle mode mobile devices 210 across carriers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
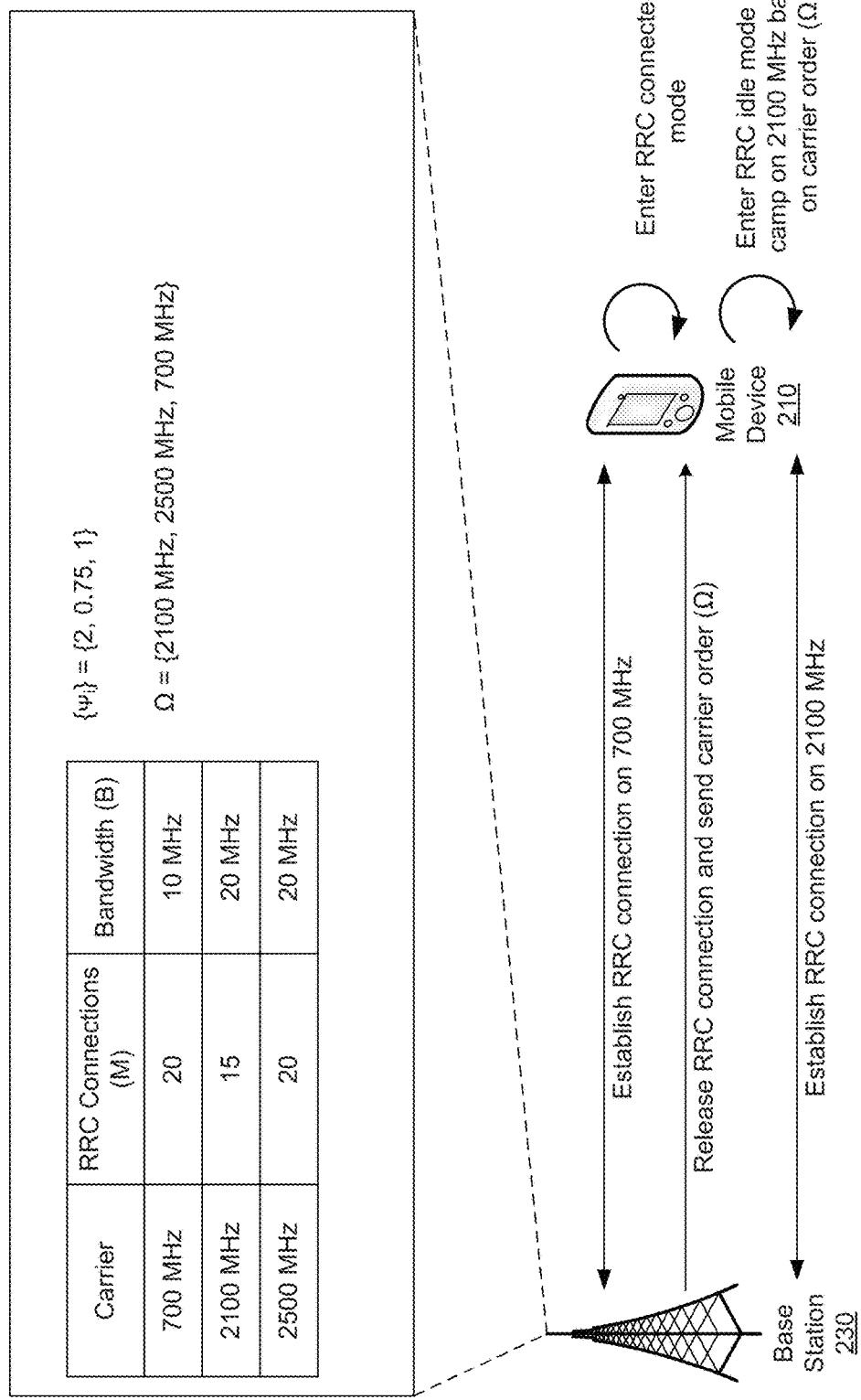
FIG. 5 is a diagram of an example implementation relating to the example process shown in FIG. 4.

FIG. 5 is a diagram of an example implementation 500 relating to example process 400 shown in FIGS. 4A and 4B. FIG. 5 shows an example of load balancing mobile devices 210 in an idle mode.

In FIG. 5, assume base station 230 supports three different carriers: a 700 MHz band, a 2100 MHz band, and a 2500 MHz band. Also, assume mobile device 210 is in an idle mode and camping on the 700 MHz band.

As shown in FIG. 5, a RRC connection may be established between base station 230 and mobile device 210 using the 700 MHz band based on mobile device sending a RRC connection request to base station 230 on a random access channel in the 700 MHz band. Mobile device 210 may enter a RRC connected mode based on establishing the RRC connection.

As shown in FIG. 5, assume that the 700 MHz band has a bandwidth $B_{700}$ of 10 MHz, that the 2100 MHz band has a bandwidth $B_{2100}$ of 20 MHz, and that the 2500 MHz band has a bandwidth $B_{2500}$ of 20 MHz. Further, assume that base station 230 detects, within a particular time period, 20 RRC connection initiations $M_{700}$ on the 700 MHz band, 15 RRC connection initiations $M_{2100}$ on the 2100 MHz band, and 20 RRC connection initiations $M_{2500}$ on the 2500 MHz band.

Base station 230 may calculate an idle mode population index $\psi$ for each of the 700 MHz band, the 2100 MHz band, and the 2500 MHz band based on the bandwidth B and the number of RRC connection initiations M for each carrier. For example, an idle mode population index $\psi_{700}$ for the 700 MHz band may be calculated as $\psi_{700}=M_{700}/B_{700}=20/10=2$. An idle mode population index $\psi_{2100}$ for the 2100 MHz band may be calculated as $\psi_{2100}=M_{2100}/B_{2100}=15/20=0.75$. An idle mode population index $\psi_{2500}$ for the 2500 MHz band may be calculated as $\psi_{2500}=M_{2500}/B_{2500}=20/20=1$. In this example, a lower idle mode population index $\psi$ may be associated with a higher priority. In other words, a carrier with a lower idle mode population index $\psi$ may have a lower normalized amount of camping mobile devices 210 than a carrier with a higher idle mode population index $\psi$. Thus, idle mode mobile devices 210 should be placed on the carrier with the lower idle mode population index $\psi$.

Base station 230 may sort the carriers according to their priorities based on the idle mode population indexes of the carriers. Accordingly, base station 230 may determine a carrier order Ω of {2100 MHz, 2500 MHz, 700 MHz} based on the idle mode population index value $\psi_{2500}$ for the 2500 MHz band being equal to 0.75, which is less than an idle mode population index value $\psi_{2500}$ for the 2500 MHz band which is equal to 1, which is less than an idle mode population index value $\psi_{700}$ for the 700 MHz band which is equal to 2.

As shown in FIG. 5, base station 230 may determine to release the RRC connection with mobile device 210 and send information indicating the carrier order to mobile device 210.

Mobile device 210 may receive the information and enter a RRC idle mode based on the RRC connection being released. Assume mobile device 210 supports all of the 700 MHz, 2100 MHz, and 2500 MHz bands and that mobile device 210 detects a signal strength of each carrier that satisfies a threshold signal strength. Accordingly, mobile device 210 may select the 2100 MHz band to camp on in the RRC idle mode based on the carrier order indicating that the 2100 MHz band has the highest priority (e.g., listed first in the carrier order).

Thus, when mobile device 210 attempts to establish a subsequent RRC connection with base station 230 or another base station 230, mobile device 210 will send a RRC connection request on a random access channel of the 2100 MHz band on which mobile device 210 is camping, and the RRC connection will be established on the 2100 MHz band.

In this way, a load may be balanced among different carriers using an idle mode load balancing.

As indicated above, FIG. 5 is provided merely as an example. Other examples are possible and may differ from what was described with regard to FIG. 5.

Idle mode load balancing, as described herein, may avoid or reduce congestion on random access channels of carriers by causing mobile devices to use different carriers to initiate a RRC connection. Additionally, or alternatively, idle mode load balancing may minimize or reduce the inter-carrier handover of a communication session due to RRC connection being originally initialized on an appropriate carrier.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, the term carrier is intended to be broadly construed as a radio frequency and/or a range of radio frequencies. For example, a carrier may include a frequency band used for wireless communication. The carrier may have a particular bandwidth. A carrier may include multiple channels, including a random access channel and a control channel.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
 establish a wireless connection with a mobile device;
 determine an index value for each of a plurality of carriers that may be used for the wireless connection,
  the index value for a respective carrier, of the plurality of carriers, being determined based on a quantity of idle mode devices using the respective carrier in an idle mode, and
  the index value for the respective carrier being normalized based on a bandwidth of the respective carrier;
 generate a carrier order that indicates a priority for each of the plurality of carriers,
  the carrier order being generated based on sorting the plurality of carriers based on the index value for each of the plurality of carriers;
 send order information indicating the carrier order to the mobile device via the wireless connection; and
 cause the mobile device to use a carrier, of the plurality of carriers, in the idle mode based on the carrier order.

2. The device of claim 1, where the one or more processors are further to:
 determine to release the wireless connection; and
 where the one or more processors, when sending the order information, are to:
  send the order information to the mobile device based on determining to release the wireless connection.

3. The device of claim 1, where the one or more processors, when determining the index value, are to:
 estimate the quantity of idle mode devices based on a quantity of connected mode devices that wirelessly connect to the device using the respective carrier.

4. The device of claim 3, where an idle mode device does not have a Radio Resource Control (RRC) connection with the device, and
 where the connected mode devices have RRC connections with the device.

5. The device of claim 1, where the wireless connection is a Radio Resource Control (RRC) connection, and
 where the one or more processors, when sending the order information, are to:
  send the order information to the mobile device through dedicated priorities in RRC signaling when releasing the RRC connection.

6. The device of claim 1, where the idle mode is a Radio Resource Control (RRC) idle mode.

7. The device of claim 1, where the plurality of carriers comprise frequencies in at least one of:
 a 700 MHz band,
 a 2100 MHz band, or
 a 2500 MHz band.

8. A non-transitory computer-readable medium storing instructions, the instructions comprising:
 one or more instructions that, when executed by one or more processors, cause the one or more processors to:
  establish a wireless connection with a mobile device;
  determine an index value for each of a plurality of carriers that may be used for the wireless connection;
   the index value for a respective carrier, of the plurality of carriers, being determined based on a quantity of idle mode devices using the respective carrier in an idle mode, and
   the index value for the respective carrier being normalized based on a bandwidth of the respective carrier;
  generate a carrier order that indicates a priority for each of the plurality of carriers,
   the carrier order being generated based on sorting the plurality of carriers based on the index value for each of the plurality of carriers;
  determine to release the wireless connection; and
  send, based on determining to release the wireless connection, order information indicating the carrier order to the mobile device via the wireless connection.

9. The non-transitory computer-readable medium of claim 8, where the one or more instructions, that send the order information, cause the one or more processors to:
 cause the mobile device to use a carrier, of the plurality of carriers, in the idle mode based on the carrier order.

10. The non-transitory computer-readable medium of claim 8, where the one or more instructions, that determine the index value, cause the one or more processors to:
 estimate the quantity of idle mode devices based on a quantity of connected mode devices that wirelessly connect to a device using the respective carrier.

11. The non-transitory computer-readable medium of claim 10, where an idle mode device does not have a Radio Resource Control (RRC) connection with the device, and
 where the connected mode devices have RRC connections with the device.

12. The non-transitory computer-readable medium of claim 8, where the idle mode is a Radio Resource Control (RRC) idle mode.

13. The non-transitory computer-readable medium of claim 8, where the plurality of carriers comprise frequencies in at least one of:
 a 700 MHz band,
 a 2100 MHz band, or
 a 2500 MHz band.

14. A method, comprising:
- establishing, by a device, a wireless connection with a mobile device;
- determining, by the device, an index value for each of a plurality of carriers that may be used for the wireless connection,
  - the index value for a respective carrier, of the plurality of carriers, being determined based on a quantity of idle mode devices using the respective carrier in an idle mode, and
  - the index value for the respective carrier being normalized based on a bandwidth of the respective carrier;
- generating, by the device, a carrier order that indicates a priority for each of the plurality of carriers,
  - the carrier order being generated based on sorting the plurality of carriers based on the index value for each of the plurality of carriers;
- sending, by the device, order information indicating the carrier order to the mobile device via the wireless connection; and
- causing, by the device, the mobile device to use a carrier, of the plurality of carriers, in the idle mode based on the carrier order.

15. The method of claim 14, further comprising:
- determining, by the device, to release the wireless connection; and
- where sending the order information comprises:
  - sending the order information to the mobile device based on determining to release the wireless connection.

16. The method of claim 14, where determining the index value comprises:
- estimating the quantity of idle mode devices based on a quantity of connected mode devices that wirelessly connect to the device using the respective carrier.

17. The method of claim 16, where an idle mode device does not have a Radio Resource Control (RRC) connection with the device, and
- where the connected mode devices have RRC connections with the device.

18. The method of claim 14, where the wireless connection is a Radio Resource Control (RRC) connection, and
- where sending the order information comprises:
  - sending the order information to the mobile device through dedicated priorities in RRC signaling when releasing the RRC connection.

19. The method of claim 14, where the idle mode is a Radio Resource Control (RRC) idle mode.

20. The method of claim 14, where the plurality of carriers comprise frequencies in at least one of:
- a 700 MHz band,
- a 2100 MHz band, or
- a 2500 MHz band.

* * * * *